United States Patent [19]

Nemoto

[11] 4,202,615
[45] May 13, 1980

[54] SINGLE LENS REFLEX CAMERA WITH ELECTRICAL SHUTTER

[75] Inventor: Kazuyuki Nemoto, Hachioji, Japan
[73] Assignee: Olympus Optical Co., Ltd., Japan
[21] Appl. No.: 966,359
[22] Filed: Dec. 4, 1978
[30] Foreign Application Priority Data
 Dec. 28, 1977 [JP] Japan .................................. 52/159976
[51] Int. Cl.² ........................ G03B 19/12; G03B 9/08; G03B 9/64
[52] U.S. Cl. .................................... 354/152; 354/235; 354/238
[58] Field of Search ............... 354/266, 268, 153, 234, 354/235, 237, 238, 152, 156

[56] References Cited

U.S. PATENT DOCUMENTS

| | | | |
|---|---|---|---|
| 3,768,390 | 10/1973 | Kobori | 354/235 X |
| 3,824,612 | 7/1974 | Uno et al. | 354/266 |
| 3,829,873 | 8/1974 | Imura et al. | 354/156 |
| 3,875,580 | 4/1975 | Watanabe et al. | 354/268 |
| 3,955,209 | 5/1976 | Akiyama | 354/234 |
| 3,961,343 | 6/1976 | Shono | 354/156 |

Primary Examiner—Donald A. Griffin
Attorney, Agent, or Firm—Lerner, David, Littenberg & Samuel

[57] ABSTRACT

A single lens reflex camera with electrical shutter comprises an electromagnet assembly which is energized from a power supply whenever the supply voltage is above a given level. The camera includes a movable reflecting mirror which is adapted to move upwardly in response to a shutter release operation. The camera comprises a mirror blocking mechanism which permits an upward movement of the mirror when the electromagnet assembly is energized, but which blocks the mirror in the course of its upward movement when the electromagnet assembly is not energized to provide an alarm that the supply voltage is reduced. A self-timer delay circuit is also provided to delay the energization of the electromagnet assembly.

10 Claims, 13 Drawing Figures

SINGLE LENS REFLEX CAMERA WITH ELECTRICAL SHUTTER

BACKGROUND OF THE INVENTION

The invention relates to a single lens reflex camera with electrical shutter, and more particularly, to a supply voltage alarm unit including an electromagnet assembly for producing an alarm to indicate that a supply voltage is insufficient to operate an electrical shutter as well as a self-timer which delays the operation of the electromagnet assembly.

A single lens reflex camera incorporating an electrical shutter must be provided with some means which indicates to a user the fact that a supply voltage is insufficient to operate the electrical shutter or that the loading of a supply battery has been inadvertently forgotten. Otherwise, the user fails to take the picture which he intended by depressing a shutter button. To accommodate for this difficulty, there has been proposed an arrangement in which the depression of a shutter button is inhibited whenever the supply voltage is insufficient, the supply battery is not loaded or a power switch is left open. However, the means which is proposed at this end also prohibits the depression of the shutter button whenever the exposure provided by the electrical shutter falls outside a range of proper exposure or prior to or during the film winding. This fails to provide the user with an indication of a specific cause for which the depression of the shutter button is inhibited.

There is another arrangement in which a lamp is illuminated in the course of depressing the shutter button whenever the supply voltage is above a given level. However, it should be noted that in the process of taking a picture, the user is almost entirely absorbed in the photographing operation, and as a matter of fact, users scarcely recognize the illumination of such lamp.

A further proposal relates to a camera incorporating a shutter locking mechanism which becomes effective when the supply voltage is found to be insufficient. However, the mechanism is complex, and maintains the shutter locked if the supply voltage is returned to a normal level. This requires a separate release mechanism, contributing to a further complication and an increased cost of the resulting arrangement.

SUMMARY OF THE INVENTION

It is a principal object of the invention to provide a single lens reflex camera with electrical shutter which avoids the above mentioned disadvantages by providing an electromagnet assembly which is operative whenever the supply voltage is above a given level to permit an upward movement of a movable reflecting mirror and is operative whenever the supply voltage is reduced below the given level and is insufficient to operate an electrical shutter to block the movable mirror in the course of its upward movement, thus providing an alarm that the supply voltage is insufficient.

It is another object of the invention to provide a single lens reflex camera with electrical shutter of the kind described in which the energization of the electromagnet is delayed by a given time interval, thereby providing a self-timer operation.

In accordance with the invention, when the supply voltage is below a given level, the movable reflecting mirror moves upwardly only through a limited stroke and is locked at such position when the user depresses the shutter button. This produces a darkened field within a viewfinder, whereby the user is informed that the supply voltage is insufficient, and is instructed to interrupt the photographing operation. When a battery is replaced by a fresh one to establish a normal supply voltage, the movable reflecting mirror is allowed to move upwardly until its normal up position is reached. In this manner, there is provided a single lens reflex camera including alarm means for indicating a reduced supply voltage in a simple arrangement and without requiring the provision of a separate release mechanism.

According to another aspect of the invention, the electromagnet assembly which is used to provide an alarm that the supply voltage is insufficient may also be used to construct a self-timer, by delaying the energization thereof by a given time interval by means of a delay circuit. In this manner, it is possible to provide an internally housed self-timer within the camera. Since the only component which is additionally required to construct the self-timer is the delay circuit, it can be simply and inexpensively provided.

DESCRIPTION OF PREFERRED EMBODIMENTS

Figure 1:
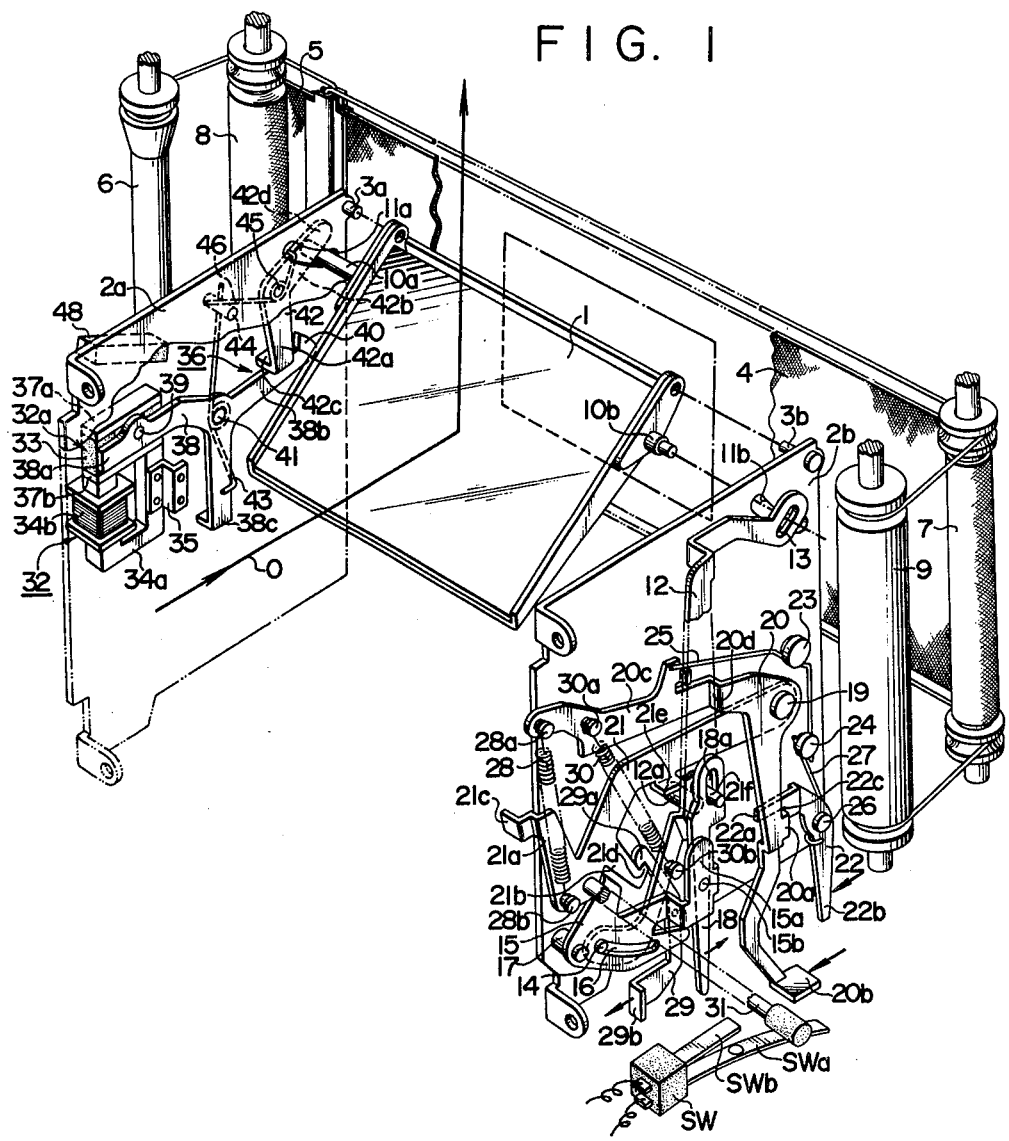
FIG. 1 is a perspective view of a supply voltage alarm unit of a single lens reflex camera according to one embodiment of the invention.

Referring to FIG. 1, there is shown a perspective view of a single lens reflex camera with an electrical shutter of focal plane type constructed in accordance with one embodiment of the invention and incorporating a supply voltage alarm unit.

As is well known, a single lens reflex camera includes a movable reflecting mirror 1 which is disposed at an angle of 45° relative to a photographing, optical path 0 and disposed forwardly of a film surfaces. The mirror 1 is angularly movable about a pair of aligned pivots 3a, 3b which are rotatably received in the top end of left- and right-hand sideplates 2a, 2b of a mirror box of the camera. When a shutter button is depressed, the mirror moves upwardly about the pivots 3a, 3b to permit an exposure of a film surface to input light which is introduced through a shutter. In the present embodiment, the shutter is shown as an electrical shutter of focal plane type including a first shutter blind 4 extending across a winding shaft 6 and take-up drum 7 and a second blind 5 extending across a winding shaft 8 and take-up drum 9.

The movable reflecting mirror 1 is associated with a drive mechanism, the construction of which is in itself well known in the art. Specifically, a pair of mirror drive pins 10a, 10b are fixedly mounted on the opposite lateral sides of the mirror 1 at symmetrical positions adjacent to the pivots 3a, 3b, and are loosely fitted in arcuate guide slots 11a, 11b formed in the sidewalls 2a, 2b, respectively. The pin 10b extends through the slot 11b formed in the right-hand sidewall 2b and extends into a slot 13 which is formed in the free end of a mirror drive member 12.

The mirror drive member 12 is disposed on the outside of the right-hand sidewall 2b and has its lower portion extending obliquely in the forward direction and its top end bent so as to extend rearwardly, with a slot 13 being formed in the free end of the rear end. The lower end of the mirror drive member 12 fixedly carries a pin 14 which is loosely fitted in an arcuate slot 16 formed in a stationary plate 15. The mirror drive member 12 is adapted to rotate counter-clockwise about pin 14 so as to drive the pins 10b, 10a clockwise to urge the movable reflecting mirror 1 to move upward. Intermediate its length and on its inner side, the mirror drive member 12 fixedly carries a pin 12a which extends toward the sidewall 2b and which operates to follow the movement of a folded piece 21e of an automatic diaphragm controlling member 21, to be described later, as the latter moves. Also, the mirror drive member 12 fixedly carries a pin 21f on its front surface and intermediate its length, the pin 21f being loosely fitted in slot 18a formed in a shutter release lever 18 to be described later.

The stationary plate 15 is mounted on the outside of the right-hand sidewall 2b at its bottom and adjacent to its forward end, by means of pin 17, so as to be integral with the sidewall 2b. The slot 16 is formed in the plate 15 adjacent to this end. The stationary plate 15 extends rearwardly, and its free end 15a extends upwardly and fixedly carries a pin 15b on which the shutter release lever 18 is pivotally mounted. The shutter release lever 18 comprises an elongated lever having an upper end in which the slot 18a is formed and engaged by pin 21f. When the mirror drive member 12 rotates counter-clockwise about pin 14, the lever 18 is driven by the pin 21f to rotate counter-clockwise about the pin 15b, and at the end of its rotation, the other end of the lever releases the shutter by starting the movement of the first blind 4.

A pivot 19 is fixedly mounted on the outside of the right-hand sidewall 2b toward its rear end, and one end of the automatic diaphragm controlling member 21 and a charging lever 20 are both concentrically and pivotally mounted on the pivot 19. The charging lever 20 has an inverted L-configuration, with its downwardly extending limb being formed, intermediate its length, with a folded piece 20a engageable with and disengageable from a return lever 22 and having its lower end formed with an actuator 20b. When the shutter is charged in response to a film winding operation, a pusher member (not shown) which is driven in interlocked relationship therewith drives the actuator 20b in a direction indicated by an arrow, whereby the charging lever 20 rotates clockwise about the pivot 19 until the folded piece 20a engages the return lever 22, thereby charging drive springs 28, 30 which will be described later. The charging lever 20 has another arm 20c which extends in a horizontal direction in a manner to cross the mirror drive member 12. A portion of the arm 20c which is located toward the pivot 19 is formed with a step 20d, which causes an angular movement of the automatic diaphragm controlling member 21 as the lever 20 rotates counter-clockwise about the pivot 19. A pin 30a is fixedly mounted on the arm 20c adjacent to its free end, and the drive spring 30 extends between the pin 30a and another pin 30b which is fixedly mounted on the mirror drive member 12. The drive spring 28 extends between a pin 28a fixedly mounted on the free end of the arm 20c and a pin 28b which is fixedly mounted on the automatic diaphragm controlling member 21. These drive springs 28, 30 comprise coiled tension springs, and the drive springs 30 urges the arm 20c of the lever 20 and the mirror drive member 12 to move toward each other while the drive spring 28 urges the arm 20c and the automatic diaphragm controlling member 21 to move toward each other.

The charging lever 20 is urged to rotate counter-clockwise about the pivot 19 by a torsion spring 25 which is disposed on a shaft 23 that is fixedly mounted on the right-hand sidewall 2b and has its one end engaged with a lateral edge of the arm 20c and its other end engaged with a stationary pin 24. The spring 25 has a strong tendency to close its limbs together, and causes the folded piece 20a to engage the return lever 22.

The return lever 22 also has an inverted L-configuration, and has its bend pivotally mounted on a pin 26. The return lever 22 has a horizontally extending arm 22a, the lower edge of which is formed, intermediate its length, with a step 22c adapted to engage the folded piece 20a of the charging lever 20. The lever 22 is urged to rotate counter-clockwise about the pin 26, by a torsion spring 27 which is disposed on the pin 26 and has its one end engaged with the stationary pin 24 and its other end engaged with the other arm 22b of the lever 22. The resulting rotation brings the step 22c into engagement with the folded piece 20a. The step 22c is disengaged from the folded piece 20a by a clockwise rotation of the return lever 22 about the pin 26 as the arm 22b is urged in a direction indicated by an arrow at the completion of an exposure when the second blind 5 has completed its running.

The automatic diaphragm controlling member 21 comprises a rockable member having its free end portion disposed to cross the mirror drive member 12, and functions to establish a predetermined diaphragm position. The member 21 is disposed below and extends parallel to the arm 20c of the charging lever 20. The free end portion of the lever 21 branches into an upper and a lower arm 21a, 21b, with the free end 21c of the upper arm 21a providing a diaphragm controller which establishes a preset diaphragm position. The lower arm 21b which extends rearwardly and downwardly and is formed with a hook 21d. A switch operating pin 31 is fixedly mounted on the free end of the lever 21. Along its lower edge, the diaphragm controlling member 21 is formed with a folded piece 21e which is adapted to bear against the pin 12a on the mirror drive member 12. The folded piece 21e drives the pin 12a to cause a clockwise rotation of the mirror drive member 12 about pin 14 to return it to its initial position when the diaphragm controlling member 21 rotates counter-clockwise about the pivot 19. When the diaphragm controlling member 21 rotates clockwise about the pivot 19, the pin 12a moves in following relationship with the folded piece 21e. The folded piece 21e also functions to block a counter-clockwise rotation of the mirror drive member 12 about pin 14 when the drive spring 30 is being charged, by the abutment of the folded piece 21e against the pin 12a.

The hook 21d formed on the automatic diaphragm controlling member 21 is adapted to engage a mating hook 29a of a release lever 29, which is pivotally mounted on the outer side of the sidewall 2b of the mirror box and which is urged to rotate counter-clockwise by a return spring (not shown) of a reduced resilience that is disposed on the pivot of the lever 29 and having its one end anchored to a stationary pin (not shown). The resulting angular movement brings the hook 29a into engagement with the mating hook 21d. The hook 29a is formed on the end of one arm of the lever 29, which has another arm having driven end 29b formed on its free end which is adapted to be driven in a direction indicated by an associated arrow when a shutter button is depressed. When the driven end 29b is moved in the direction of the arrow, the release lever 29 rotates clockwise about its pivot, whereby the hook 29a is disengaged from its associated hook 21d.

Figure 2:
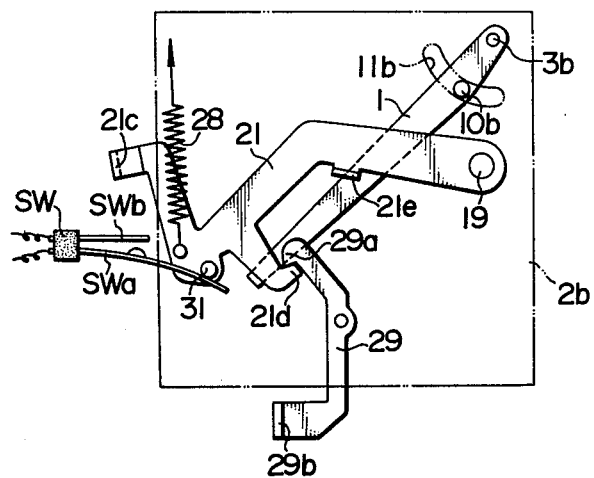
FIGS. 2 and 3 are schematic side elevations, illustrating the operation of a drive mechanism associated with the movable reflecting mirror shown in FIG. 1.
Figure 3:
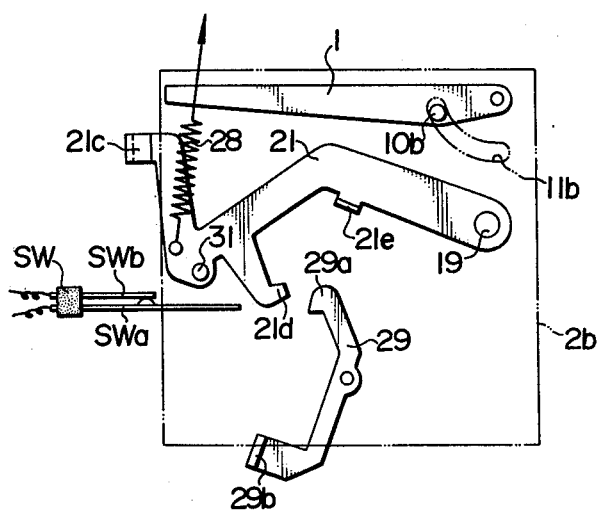

The free end of the switch operating pin 31 is disposed in opposing relationship with the movable blade contact SWa of a normally closed power switch SW which is contained in a shutter control circuit of the electrical shutter. As shown in FIG. 2, pin 31 urges the movable blade contact SWa downward as shown in FIG. 2, maintaining it away from an associated fixed blade contact SWb to open the switch. However, when the automatic diaphragm controlling lever 21 operates by turning clockwise, the pin 31 moves upward as shown in FIG. 3 to allow the blade contacts SWa, SWb to engage each other, thus closing the switch SW.

The operation of the drive mechanism associated with the movable reflecting mirror 1 will now be described. Under the condition shown in FIG. 1, the shutter has been charged in response to a film winding operation, and the charging lever 20 has its actuator 20b driven in interlocked relationship, whereby the charging lever 20 rotates clockwise about the pivot 19 against its own bias, thus charging the drive springs 28, 30.

When a shutter button is now depressed, the driven end 29b of the release lever 29 is moved in the direction of the arrow, whereby the release lever 29 rotates clockwise about its pivot, disengaging hook 29a from mating hook 21d. Thereupon, the resilience of the drive spring 28 causes the automatic diaphragm controlling the member 21 to rotate clockwise about the pivot 19, with its free end 21c operating to establish a given position for a diaphragm. The upward movement of the diaphragm controlling member 21 is stopped when its upper edge bears against the lower edge of the step 20d of the charging lever 20.

As the diaphragm controlling member 21 rotates, the mirror drive member 12 simultaneously rotates counter-clockwise about pin 14 under the resilience of the charged drive spring 30 since folded piece 21e of diaphragm controlling member 21 no longer locks pin 12a. The angular movement of the member 12 occurs in following relationship with the movement of the folded piece 21e with which the pin 12a engages.

When the mirror drive member 12 rotates, the mirror drive pin 10b engages in the slot 13, which is formed in the free end of the drive member 12, moves along the guide slot 11b formed in the right-hand sidewall 2b, thus causing the reflecting mirror to move upward through an angle of 45° until a horizontal position is reached.

When the mirror drive member 12 rotates, pin 21f acts through slot 18a to cause the release lever 18 to rotate counter-clockwise about pin 15b, whereby the shutter is released to permit a running of the first blind 4 to initiate an exposure process at the time when the movable reflecting mirror 1 has completed its upward movement. When the diaphragm controlling member 21 rotates, an upward movement of the pin 31 allows the movable blade contact SWa to move upward and to engage the fixed contact SWb, thus closing the power switch SW of the electrical shutter circuit. Consequently, an exposure control circuit including a light receiving element is activated at the same time as the first blind 4 runs to open an exposure, optical path. When a proper exposure has been given, an electromagnet (not shown) which has been constraining the second blind of the shutter is operated, allowing the second blind 5 to run to close the optical path. A complete signal is produced when the running of the second blind 5 is completed, and is effective to drive the arm 22b of the return lever 22 in the direction of the arrow. When the arm 22b is driven in this manner, the lever 22 rotates clockwise about pin 26 against its own bias, whereby the stop 22c is disengaged from the folded piece 20a of the charging lever 20, allowing the charging lever 20 to rotate counter-clockwise about the pivot 19 under the resilience of the spring 25. When the lever 20 rotates, its step 20d pushes the diaphragm controlling member 21 down, whereby the latter rotates counter-clockwise about the pivot 19. When it has been returned, to its initial position the hook 21d is engaged with the corresponding hook 29a.

The returning movement of the diaphragm controlling member 21 opens the diaphragm to its initial position, and the folded piece 21e moves pin 12a down, whereby the mirror drive member 12 also rotates clockwise about pin 14 to be returned to its initial position. Hence, the movable reflecting mirror 1 is also returned to its initial position in which it is inclined at an angle of 45° with respect to the optical path 0.

Subsequently when the shutter is charged again in response to a film winding operation, the actuator 20b of the charging lever 20 is driven in the direction of the associated arrow, and the lever 20 is rotated clockwise about the pivot 19 against the resilience of the spring 25, thus charging the drive springs 28, 30. At the completion of the charging operation, the folded piece 20a engages the step 22c of the return lever 22.

Having described the arrangement and the operation of the drive mechanism associated with the movable reflecting mirror 1, the alarm unit of the invention which acts to interrupt an upward movement of the movable reflecting mirror if the supply voltage is below a given level will now be described. Referring to FIGS. 1 to 4, the alarm unit essentially comprises an electromagnet assembly 32 which is operative whenever the supply voltage is above a given level, and a mirror blocking mechanism 36 the operation of which is controlled by the electromagnet assembly 34.

In the present embodiment, the mirror blocking mechanism 36 comprises a mirror blocking member 42 and a detent control member 38 which controls the operation of the blocking member 42. The electromagnet assembly 32 comprises a release electromagnet of known form. As is well recognized, a release electromagnet comprises a channel-shaped yoke 34a, an exciting coil 34b disposed on one limb of yoke 34a, and a movable member 32a which is mounted on an attracted portion 38a of the control member 38. The electromagnet is mounted on the outer side of the left-hand sidewall 2a of the mirror box by means of fastener 35. In the example shown, the movable member 32a has a sandwich like construction including a permanent magnet 33 which is held between a pair of upper and lower plates 37a, 37b formed of soft iron material. The central portion of the movable member 32a is pivotally mounted on pin 39 which is fixedly carried by the attracted portion 38a of the control member 38.

The detent control member 38 is T-shaped having three arms, and the attracted portion 38a is defined by an end portion of a first arm which extends in the forward direction, as viewed in FIG. 1. A second arm 38b extends generally in the opposite direction from the first arm, and is formed with a hook 40 on its free end which is adapted to engage a mating hook 42c formed on the mirror blocking member 42. In the central region, the detent control member 38 is pivotally mounted on a pin 41 which is fixedly mounted on the sidewall 2a, and is urged to rotate clockwise, as viewed in FIG. 1, by a torsion spring 43 disposed on the pin and having its one end anchored to a stationary pin 44 and its other end engaged with a lateral edge of a downwardly extending, third, return arm 38c. However, the resulting rotation is normally blocked as a result of the permanent magnet 33 of the movable member 32b being attracted by the electromagnet assembly 32.

The mirror blocking member 42 has an inverted L-shaped configuration, and has its central portion or bend pivotally mounted on a pin 45 which is fixedly mounted on the sidewall 2a. The member 42 has a downwardly extending arm 42a, the free end of which is bent at right angles to define the hook 42c adapted to engage the hook 40 of the detent control member 38. The member 42 also includes another arm 42b, the free end of which provides a blocking piece 42d which extends onto the path of movement of the mirror drive pin 10a for abutment against the latter. The mirror blocking member 42 is urged to rotate clockwise, as viewed in FIG. 1, by a torsion spring 46 of a reduced resilience which is disposed on pin 45 and having its one end anchored with a stationary pin 44 and its other end engaged with the arm 42b. In this manner, the blocking piece 42d is maintained in abutment against the pin 10a. Under this condition, the hook 42c is removed from the hook 40. It will be noted that a stop 48, formed by a plate-like rubber material, is disposed above the movable member 32a for stopping an upward movement of the latter as it is driven away from the electromagnet assembly 32.

Figure 5:
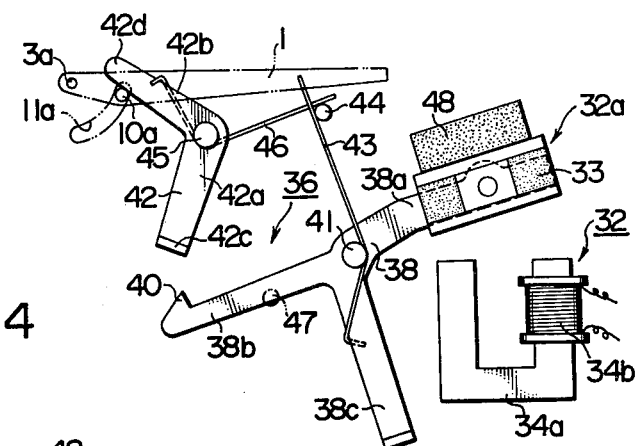
FIGS. 4 to 6 are schematic side elevations, illustrating the operation of the alarm unit shown in FIG. 1.
Figure 4:
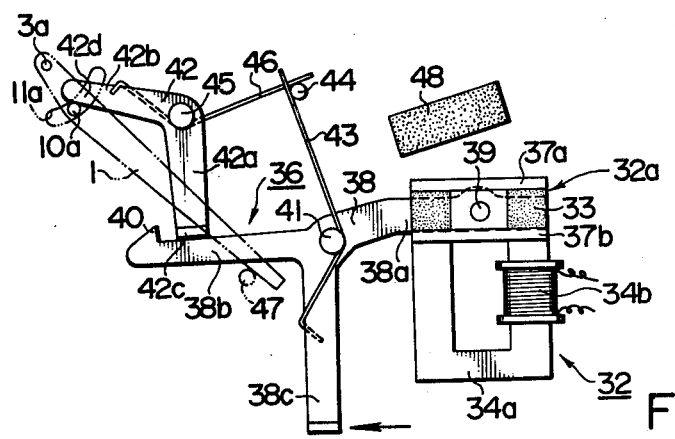
Figure 6:
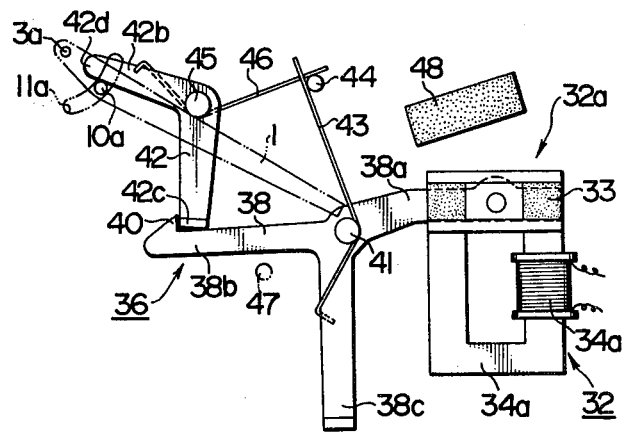

The operation of the embodiment thus constructed will now be described with reference to FIGS. 4 to 6. FIG. 4 is an enlarged front view of the alarm unit, as viewed from the opposite side of FIG. 1. In the present apparatus, the movable member 32a inclusive of permanent magnet 33 which is rockably mounted on the attracted portion 38a of the detent control member 38 is held attracted to the electromagnet 32 against the resilience of spring 43. Consequently, the detent end 42c of the mirror blocking member 32 has its lower surface situated adjacent to the upper edge of the arm 38b of the control member, and the blocking piece 42d located on the free end of the arm 42b is held in abutment against the mirror drive pin 10a as a result of a counter-clockwise rotation of the member 42 under the resilience of spring 46. If it is found that the voltage of the source battery is above a given level, the closure of the power switch SW (see FIG. 1) provided on the part of camera energizes the coil 34b contained in the electromagnet assembly 32 to cause the latter to produce a magnet force of opposite polarity to that of the permanent magnet 33, thus repelling the movable member 32a. The spring 43 then acts to move the members 32a and 34aa part, whereby the detent control member 38 rotates counter-clockwise until the movable member 32a bears against the stop 48 as shown in FIG. 5. The hook 40 moves down, and thus out of the path of rotation of the detent end 42c, permitting a clockwise rotation of the mirror blocking member 42. Under this condition, the mirror drive pin 10a is capable of driving the arm 42b against the resilience of spring 46, so that when the drive mechanism associated with the movable reflecting mirror and which is disposed on the outside of the right-hand sidewall 2b operates in response to the depression of the shutter button, the movable reflecting mirror 1 can be moved upward in a normal manner. In FIGS. 4 to 6, numeral 47 represents a stop for the mirror 1.

However, when the battery voltage is reduced below the given level and is insufficient to operate the electrical shutter properly, the current which energizes the coil 34b of the electromagnet assembly 32 also reduces, and the repelling, magnetic force produced by the electromagnet in response to the closure of the power switch is insufficient to move the movable member 32a inclusive of the permanent magnet 33 away therefrom. Thus, the movable member 32a remains attracted to the electromagnet, and hence the detent control member 38 does not rotate. If the shutter button is depressed to operate the drive mechanism of the movable reflecting mirror in order to move the reflecting mirror 1 upward, the mirror blocking member 42 rotates clockwise about pin 45 as the blocking piece 42d is urged by the pin 10a, whereby the detent end 42c is engaged with the hook 40. Thus, the upward movement of the reflecting mirror 1 is interrupted when it has only slightly moved upward. This in turn suppresses an angular movement of the drive member 12 (see FIG. 1), preventing a shutter operation. The resulting condition of the reflecting mirror 1 can be clearly recognized by a darkened field within a viewfinder (not shown), thus immediately indicating that a reduction in the supplied voltage disables a normal electrical operation of the camera. A similar result also occurs when the power switch fails to prevent a current flow from the supply to the coil of the electromagnet assembly.

The locked alarm condition of the reflecting mirror 1 can be released by the replacement of a fresh battery. When a fresh battery is inserted, the electromagnet is immediately energized to disengage the hook 40 from the detent end 42c, so that the drive mechanism of the movable reflecting mirror can continue the remaining operation until the condition shown in FIG. 5 is reached. Thus, the provision of a separate unlocking mechanism is unnecessary.

In the described embodiment, a release electromagnet which is used to lock the movable reflecting mirror 1 may be replaced by a conventional electromagnet, namely, an electromagnet to which a movable member may be attracted upon energization thereof.

Figure 7:
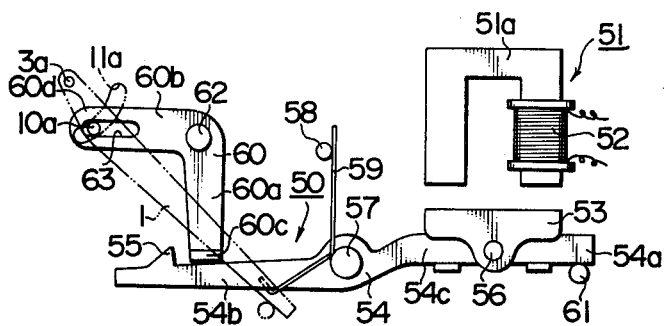
FIG. 7 is a schematic side elevation of another form of supply voltage alarm unit.
Figure 8:
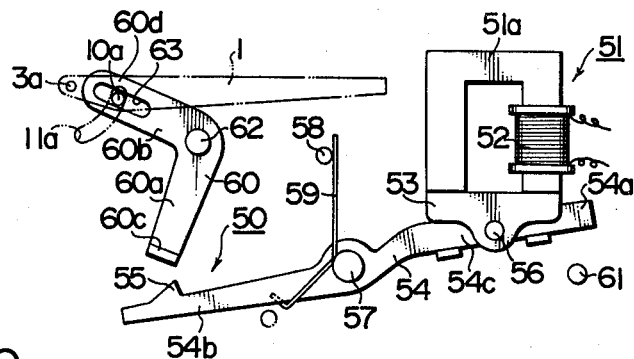
FIGS. 8 and 9 are schematic side elevations, illustrating the operation of the alarm unit shown in FIG. 7.
Figure 9:
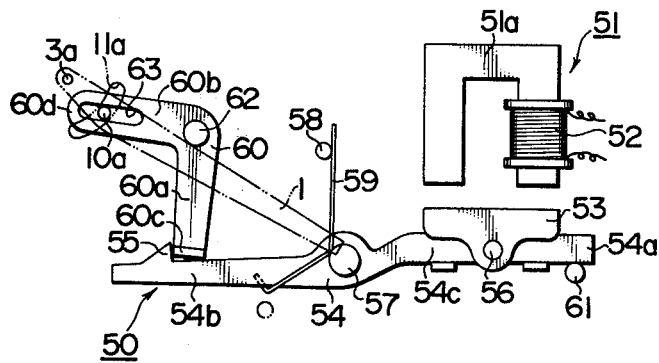

FIG. 7 shows another embodiment of the invention in which a conventional electromagnet assembly 51 is used. FIGS. 8 and 9 illustrate the operation of this embodiment. Referring to FIG. 7, a mirror blocking mechanism 50 comprises a detent control member 54 which is constructed and operates substantially similar to the detent control member 38 shown in FIG. 4. Specifically, its central region is pivotally mounted on a pin 57, and a hook 55 is formed on the end of an arm 54b thereof engagement with a detent end 60c of a mirror blocking member 60 which is constructed in the same manner as the mirror blocking member 52 shown in FIG. 4. The control member 54 also includes another arm 54c on which is fixedly mounted a support pin 56 for rockably supporting a movable member 53 for cooperation with the electromagnet assembly 51. The assembly 51 comprises a yoke 51a and a coil 52 disposed thereon which may be energized to attract the movable member 53.

The detent control member 54 is urged to rotate clockwise about pin 57, by a torsion spring 59 which is disposed on this pin and having its one end anchored to a stationary pin 58 and its other end engaged with the arm 54b. However, the resulting rotation is blocked by the abutment of the arm 54c against a stop pin 61.

The mirror blocking member 60 is in the form of a bell crank-shaped lever which is pivotally mounted on a stationary pin 62. It includes a downwardly extending arm 60a, the free end of which is formed with the detent end 60c. The member 60 also includes another arm 60b, the free end of which serves as a blocking piece 60d. Specifically, the free end of arm 60b is formed with an elongated slot 63, into which is fitted the mirror drive pin 10a mounted on the movable reflecting mirror 1.

In operation, when the supply voltage is sufficient, the coil 52 can be sufficiently energized to permit the electromagnet to hold the movable member 53 attracted thereto, causing a counter-clockwise rotation of the detent control member 54 against the resilience of spring 59, as shown in FIG. 8. This moves the hook 55 out of the path of rotation of the detent end 60c, permitting an upward movement of the mirror 1. However, when the supply voltage is reduced, the electromagnet assembly 51 cannot be sufficiently energized to attract the movable member 53 so that a rotation of the detent control member 54 does not occur and hence the upward movement of the movable reflecting mirror 1 is interrupted in the course of such movement, by the mirror blocking member 60, as indicated in FIG. 9, providing an alarm that the supply voltage is reduced.

Figure 10:
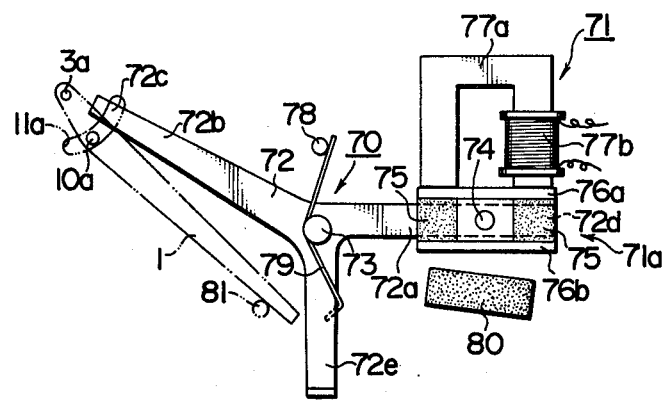
FIGS. 10 to 12 are schematic side elevations of a further form of supply voltage alarm unit.
Figure 11:
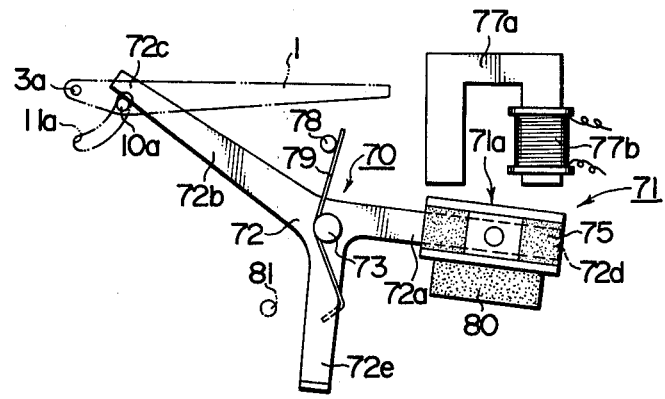
Figure 12:
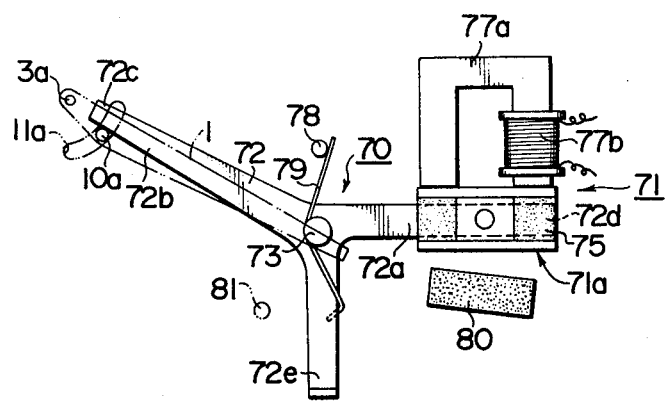

FIG. 10 shows a further embodiment of the invention, and FIGS. 11 and 12 illustrate the operation thereof. In this embodiment, an electromagnet assembly 71 comprises a release electromagnet which construction is similar to that shown in FIGS. 1 to 6. A mirror blocking mechanism 70 comprises a mirror blocking control member 72 having three arms and which serves a combined purposes of the mirror blocking function and the detent control function which have been achieved by separate members 42, 60; or 38, 54 in the previous embodiments.

As shown in FIG. 10, the mirror blocking control member 52 has its central region pivotally mounted on a pin 73, and includes a first arm 72a which extends towards the front of a camera, or to the left as viewed in FIG. 10. The free end portion of the arm 72 provides an attracted portion 72d which cooperates with the electromagnet assembly 71. A pin 74 is fixedly mounted on the portion 72d and rockably mounts a movable member 71a which comprises a permanent magnet 75 held between a pair of upper and lower plates 76a, 76b formed of soft iron material. The electromagnet comprises a yoke 77a and an exciting coil 77b disposed thereon. The movable member is normally held attracted to the end faces of the yoke as a result of the magnetic influence of the permanent magnet 75. A stop 80 is associated with the movable member while a stop for the movable reflecting mirror 1 is shown at 81.

The mirror blocking control member 72 includes a second arm 72b which extends to the opposite side from the first arm 72a, and which has a blocking piece 72c defined on the free end thereof which extends onto the path of movement of the mirror drive pin 10a. Normally, the blocking piece 72c is spaced a certain distance from the pin 10a when the movable member is held attracted to the electromagnet assembly 71.

The member 72 is urged to rotate clockwise, as viewed in FIG. 10, about its pin 73 by a torsion spring 79 which is disposed thereon and having its one end anchored to a stationary pin 78 and its other end engaged with a third, downwardly extending return arm 72e. However, the resulting rotation is normally prevented by the abutment of the movable member 71a against the end faces of the yoke 77a.

In operation, when the supply voltage is sufficient, the closure of the power switch energizes the electromagnet assembly 71, which then produces a magnetic force of the opposite polarity from that of the permanent magnet 75 to repel the movable member 71a. Thereupon, the mirror blocking control member 72 rotates clockwise about the pin 73 under the bias applied thereto, until the movable member 71a bears against the stop 80 as shown in FIG. 11. Under this condition, the blocking piece 72c on the second arm 72b moves out of the path of movement of the mirror drive pin 10a, thus permitting an upward movement of the mirror 1.

However, when the supply voltage is reduced, the electromagnet assembly 71 is not sufficiently energized to repel the movable member 71a, which remains attracted to the assembly 71. Consequently, a rotation of the member 72 does not occur, leaving the second arm 72b or its blocking piece 72c on the path of movement of the pin 10a to block the mirror 1 in the course of its upward movement. This results in a darkened field within the viewfinder, indicating that the supply voltage is reduced.

It should be understood that instead of directly energizing the electromagnet assembly from the power supply, the supply may be connected with a voltage decision circuit which in turn feeds the electromagnet.

It will be appreciated from the foregoing description that the electromagnet assemblies 32, 51, 71 have the functions of determining the supply voltage as well as of momentarily preventing a shutter operation immediately before it is activated. The latter capability may be utilized to provide a self-timer function so that the electromagnet assembly is energized after a given time interval, by connecting a delay circuit in the circuit path to energize the respective electromagnet assemblies 32, 51, 71.

Figure 13:
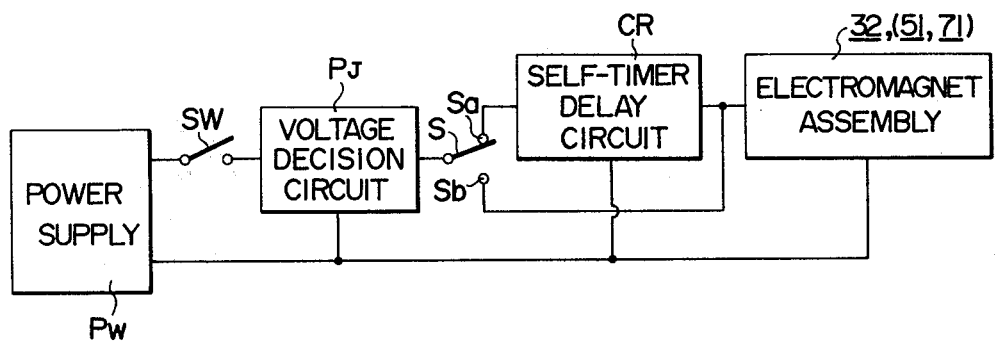
FIG. 13 is a block diagram of the electrical circuit of a self-timer constructed in accordance with the invention.

FIG. 13 is a block diagram of the electrical circuit of a self-timer which is constructed according to the invention. Specifically, a power supply Pw is connected through a power switch SW with a voltage decision circuit Pj which determines whether the supply voltage is above a given level. The output of the decision circuit Pj is connected with a movable contact of a changeover switch S, which can be switched between a pair of fixed contacts Sa, Sb. The contact Sa is connected with a self-timer delay circuit CR which is in turn connected with the electromagnet assembly 32. The contact Sb is directly connected with the electromagnet assembly.

The delay circuit CR comprises a CR time constant circuit including a capacitor and a resistor. When a self-timer operation is desired, the switch S can be thrown to the contact Sa, whereby the decision circuit Pj is connected through the delay circuit CR with the electromagnet assembly 32 (or 51, 71). In this instance, an output of the decision circuit energizes the electromagnet assembly after a given length of time delay determined by the delay circuit CR. However, the switch S is normally thrown to the other fixed contact Sb so that the output of the decision circuit Pj is directly connected with the electromagnet assembly 32.

When the switch is thrown to the self-timer position and power switch SW is turned on, the electromagnet assembly 32 is not energized immediately, so that the movable reflecting mirror 1 (see FIG. 1) will be stopped at a slightly raised position by the combination of the electromagnet assembly 32 (51 or 71) and the mirror blocking mechanism (36, 50 or 70). When a time interval determined by the delay circuit CR, which may be on the order of 10 to 15 seconds, passes, the electromagnet assembly 32 is energized to permit a normal operation of the mirror drive mechanism to actuate the shutter, thus allowing a photographing operation with the aid of the self-timer.

What is claimed is:

1. A single lens reflex camera with electrical shutter comprising a power supply which is used to operate said camera electrically, an electromagnet assembly coupled to said power supply and assuming a first condition whenever the supply voltage of said power supply is above a given level which is required for a normal operation of said camera and a second condition when the supply voltage is below said given level, a movable reflecting mirror and means responsive to a shutter release operation for moving said mirror in a first direction and for operating a shutter of the camera at the termination of the movement of said reflecting mirror in said first direction, and a mirror blocking mechanism controlled by the electromagnet assembly for permitting movement of the movable reflecting mirror in said first direction when the electromagnet assembly assumes said first condition and for blocking the movable reflecting mirror in the course of its movement in said first direction when the electromagnet assembly assumes said second condition, thereby providing an alarm that the supply voltage is reduced, said mirror blocking mechanism comprising a mirror blocking member having a blocking piece engageable with the movable reflecting member, and a detent control member having an attractive portion which is adapted to be held attracted to the electromagnet assembly and a hook engageable with the mirror blocking member when said attractive portion is displaced from said electromagnet assembly.

2. A single lens reflex camera according to claim 1 in which said camera includes a mirror box housing said mirror, said mirror blocking member comprising a lever pivotally mounted on one sidewall of said mirror box and having a first arm including a detent end engageable with the hook of the detent control member and a second arm including a blocking piece which is engageable with the movable reflecting mirror.

3. A single lens reflex camera according to claim 1 in which said camera includes a mirror box housing said mirror, said detent control member comprising a lever pivotally mounted on one sidewall of said mirror box and having a first arm which is adapted to be held attracted to the electromagnet assembly and a second arm on which the hook is formed.

4. A single lens reflex camera according to claim 1 in which said camera comprises a mirror box housing said mirror and said mirror blocking mechanism comprises a lever pivotally mounted on one sidewall of said mirror box and having a first arm which is adapted to be held attracted to the electromagnet assembly and a second arm including a blocking piece which is operative to block movement of the movable reflecting mirror in said first direction.

5. A single lens reflex camera according to claim 1 in which the electromagnet assembly is a release type electromagnet including a permanent magnet and a repelling electromagnet which includes a yoke and an exciting coil.

6. A single lens reflex camera according to claim 1 in which the electromagnet assembly comprises an attracting electromagnet including a yoke and an exciting coil.

7. A single lens reflex camera with electrical shutter comprising a power supply for powering said camera, an electromagnet assembly including an electromagnet coupled to said power supply and adapted to assume a first state whenever the supply voltage is above a given level required for a normal operation of the camera, a movable reflecting mirror and means responsive to a shutter release operation for moving said mirror toward a first position and means responsive to arrival of said mirror at said first position for operating said electrical shutter, a mirror blocking mechanism controlled by said electromagnet assembly for permitting movement of the movable reflecting mirror in said first direction when the electromagnet assembly is energized and for blocking the movable reflecting mirror in the course of movement towards said first position when the electromagnet assembly assumes a second state, and a self-timer delay circuit which is selectively connected in the electrical path between the power supply and said electromagnet assembly for delaying the energization of the electromagnet assembly by a given time interval.

8. A single lens reflex camera according to claim 7 in which the self-timer delay circuit is connected between said power supply and said electromagnet assembly through a changeover switch which is selectively operated to establish a self-timer operation.

9. A single lens reflex camera according to claim 9 in which the delay circuit comprises a CR time constant circuit comprising at least one capacitor and at least one resistor.

10. A single lens reflex camera according to claim 7 in which the delay circuit is connected with the power supply through a voltage decision circuit which determines whether or not the supply voltage of said power supply is above a given level.

* * * * *

UNITED STATES PATENT AND TRADEMARK OFFICE
CERTIFICATE OF CORRECTION

PATENT NO. : 4,202,615
DATED : May 13, 1980
INVENTOR(S) : Kazuyuki Nemoto

It is certified that error appears in the above—identified patent and that said Letters Patent is hereby corrected as shown below:

Column 4, line 8, change "springs" to --spring--.

Column 5, line 41, delete "the" first occurrence.

Column 5, line 56, change "engages" to --engaged--.

Column 9, line 52, change "72" to --72a--.

Claim 9, line 1, change "9" to --7--.

Signed and Sealed this

Twenty-fourth Day of March 1981

[SEAL]

Attest:

RENE D. TEGTMEYER

Attesting Officer

Acting Commissioner of Patents and Trademark